Figure 6:
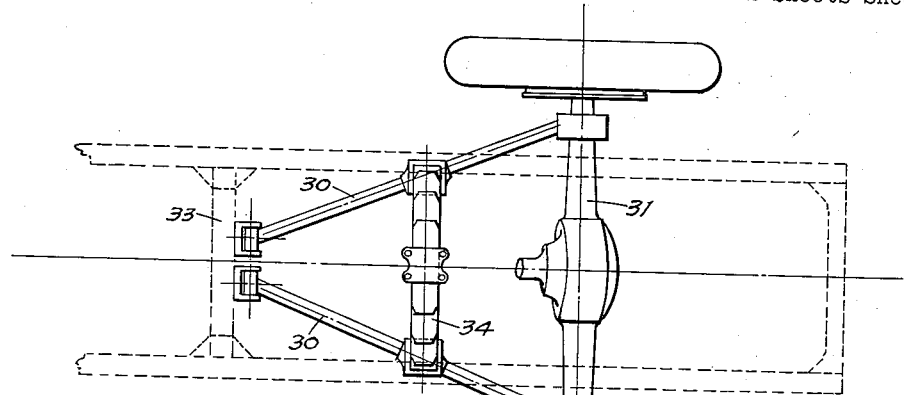

Aug. 11, 1936. E. FAVARY 2,050,693
SPRING SUSPENSION FOR VEHICLES
Filed April 23, 1934     2 Sheets-Sheet 1
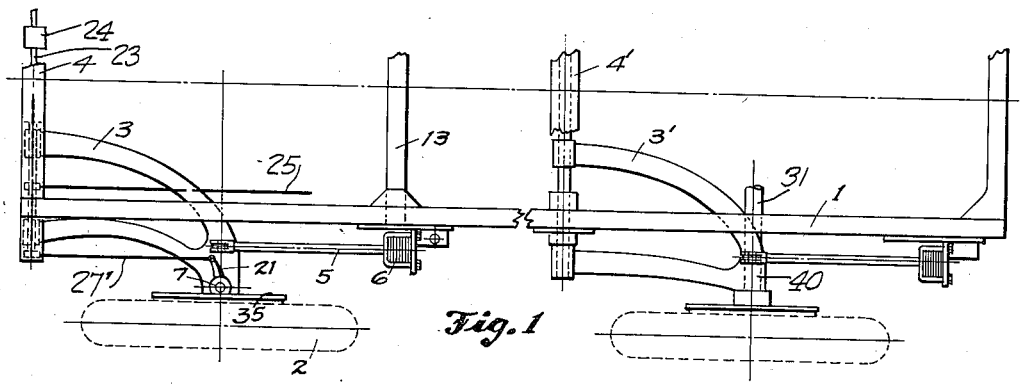
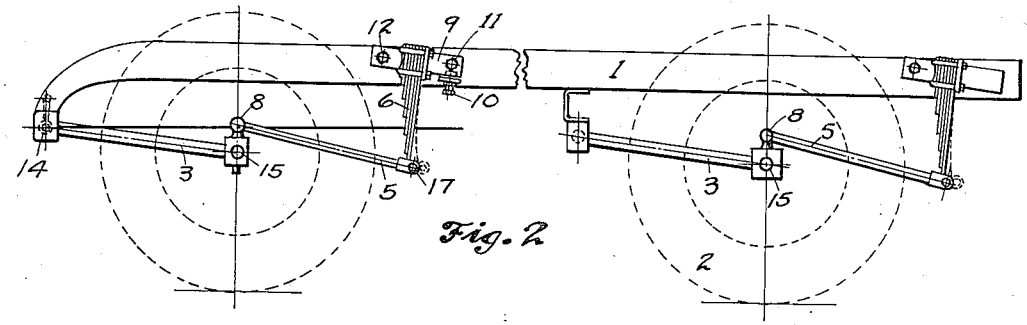
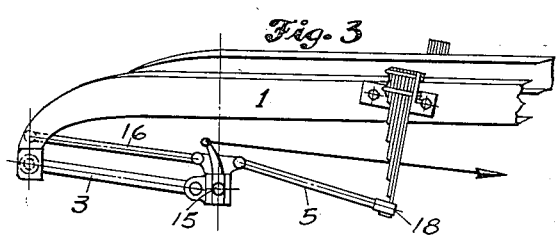
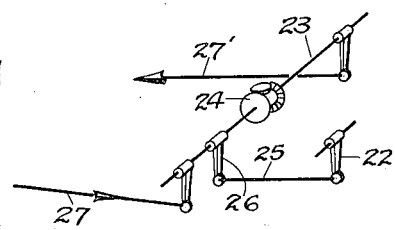
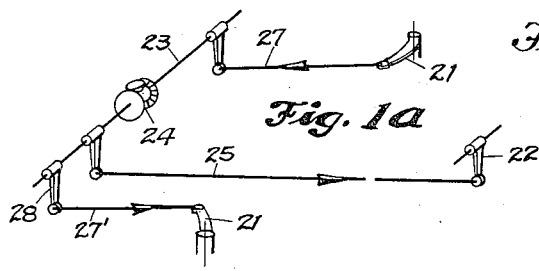
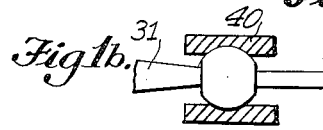
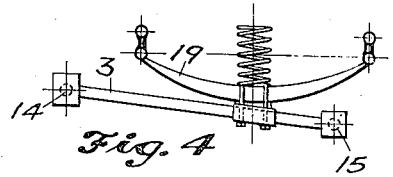
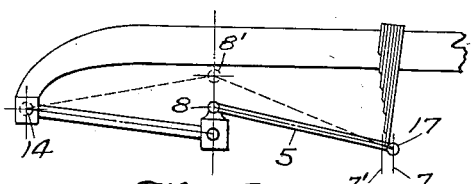
INVENTOR
Ethelbert Favary Aug. 11, 1936.   E. FAVARY   2,050,693
SPRING SUSPENSION FOR VEHICLES
Filed April 23, 1934   2 Sheets-Sheet 2

INVENTOR
Ethelbert Favary

Patented Aug. 11, 1936

2,050,693

UNITED STATES PATENT OFFICE 2,050,693

SPRING SUSPENSION FOR VEHICLES

Ethelbert Favary, Burbank, Calif.

Application April 23, 1934, Serial No. 721,985

6 Claims. (Cl. 267—19)

This invention relates to new and useful improvements in spring suspensions for vehicles and is especially adapted for individual wheel suspensions and for suspensions combined with correct steering mechanisms. It is also applicable to the suspension of conventional rear axles.

For a full understanding of the invention, reference is to be had to the following specification where I have described some forms of my invention; they may be varied or modified, however, without departing from the spirit of my invention.

In the drawings forming part of this specification, like reference characters denote like parts in all the figures.

Figure 7:
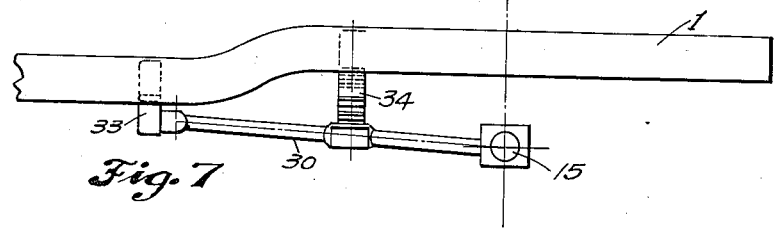
Figure 8:
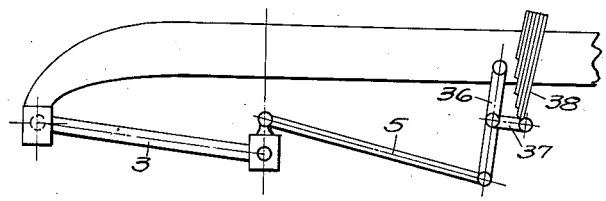
Figure 9:
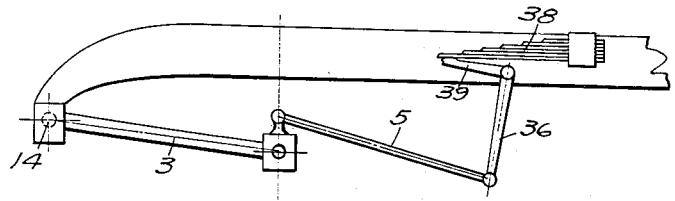

In the accompanying drawings, Figs. 1 and 2 show a plan view and side view respectively of a portion of a vehicle chassis embodying my invention. Fig. 1—b is a cross section of a detail; Fig. 1—a is a steering arrangement used in connection therewith; Fig. 3 shows a partial side view of a modified form of the invention; Fig. 3—a, a modified form of steering layout which may be used either with the construction shown in Fig. 1 or Fig. 3; Fig. 4 is a modification showing different types of springs used; Fig. 5 illustrates the operating principle of the suspension described in Figs. 1 to 3; Figs. 6 and 7 show a partial plan view and side view of a chassis embodying my construction for rear axles; Figs. 8 and 9 show modified forms of my invention.

In the figures, 1 represents a portion of the frame of a vehicle; 2 the wheels, which are shown dotted in Figs. 1 and 2, for the sake of clarity; 3 denotes a bracket, one end of which supports the wheel, the other end or ends being attached to a strong cross member 4, at widely separated points thereof; 5 is a substantially horizontal suspension member connecting the bracket near its attachment to the wheel with the spring structure 6, either directly, as shown in Fig. 2, or through a substantially vertical tension member 36, and spring structures 38, as shown in Figs. 8 and 9; 7 represents the knuckle pin of the steering knuckle in common use.

In operation, when the wheel encounters an obstruction, it will move upward, increasing the tension in member 5, thereby increasing the spring flexure. With this type of construction a large amount of vertical wheel displacement is obtained with a comparatively small spring deflection, as illustrated in Fig. 5. When the spring eye moves from 7 to 7', point 8 of the bracket will move to 8', which is large in comparison with the spring eye motion. On account of the large angle formed between points 14, 8', 17, this suspension is very sensitive at light loads, which is not the case with the conventional semi-elliptic spring suspension, yet when the load increases, the said angle becomes smaller, thereby reducing the proportionate tension in member 5 and the stress on the spring in comparison with the load.

Bracket 3' is shown supporting the rear wheel in a similar manner, as that shown in the front. The cross members 4 and 4' are made sufficiently strong to take the bending and twisting stresses arising from the support of the wheels. Bracket 3, as well as tension member 5 may be made of any suitable material and shape and they may be connected together in any suitable manner.

9 represents the spring bracket which is attached to the frame. The frame may, of course, be stiffened, as found necessary, and the spring or the spring bracket may be provided with any suitable tensioning means.

In Fig. 2 may be seen an adjusting bolt 10 passing through a separate bracket attached to the frame. Bolt 11, which passes through the spring bracket, is located in a slot or oblong hole in the frame so that when bolt 10 is screwed upward the spring eye will tend to move to the right, thereby tensioning the spring, after which bolts 11 and 12 may be tightened. The axis 14 of bracket 3 may be located higher or lower as found most efficient so as to predetermine the arc on which the wheel spindle should travel when the vehicle is in operation on the road.

In the drawings, 15 denotes the wheel spindles or axles. Instead of supporting the wheel through the knuckle and knuckle pin solidly in the end of bracket 3, as shown, said bracket may be pivotally attached with the knuckle or knuckle pin bracket, as shown in Fig. 3. In this figure I have also shown a parallel bar 16, which would guide the knuckle pin to move up and down without changing the angle or the caster of said pin. This parallel bar 16 operates in the well known manner and it is therefore not considered necessary to describe it in detail. The end of the spring may be attached to the end 17 of suspension member 5 by means of a spring eye and spring bolt, or it may be clamped firmly to the suspension member, as shown in Fig. 3 at 18.

Fig. 4 shows a modified form of construction where I eliminate the tension member by placing the spring directly above the bracket 3. I may use the ordinary semi-elliptic spring, or a coiled spring, or both together as shown, or any other type of spring; said spring or springs can be mounted directly above the wheel center 15, or they may be mounted above or below said bracket 3, and at a point between 14 and 15 as shown in this figure. With such a construction the wheel center 15 will move up a greater distance than the flexure or compression of the spring or springs.

The rear wheels shown at the right of Figs. 1 and 2 may be individually sprung in a similar manner as the front wheels, in which case the wheels would be driven through axle shafts provided with universal joints, in the well known manner. If desired, the present day rigid axle housing may be used, which extends from one side of the vehicle to the other. In order to eliminate stresses and strains in the bracket and the axle with such a construction, the connection between the bracket and the axle or axle housing may be made through some type of ball and socket joint, the construction of which is well known in the art. In Fig. 1—b, 31 represents a portion of the axle housing to which the ball portion of the socket is attached, while 40 shows the socket portion of the joint in cross section, said socket being a part of the right hand end of bracket 3', shown in the right hand view of Fig. 1. Or, I may use a triangular or "wishbone" bracket with the two ends solidly attached to the axle housing at widely separated points, and the single end attached to a cross member 4' in the middle of the frame. Instead of a wishbone bracket I may use two separate rods or brackets 30 (see Figs. 6 and 7) one end of each being attached to axle 31 at widely separated points, while the other end 32 is attached to cross member 33 through a universal joint, or other suitable joints or pivots. By virtue of the angle formed between the axle and said brackets or rods 30 and their connections with each other and with the cross member, see Fig. 6, the axle is prevented from lateral or longitudinal displacement with respect to the frame. Means are provided between 30 and the axle housing 31 to allow for the slight angular displacement of the axle housing from the horizontal line when one wheel should rise higher than the other. This can be accomplished by allowing the axle housing to oscillate slightly around bracket 30, in any suitable manner, one method being illustrated in Fig. 1—b.

With this type of construction I may use the springs shown in Figs. 1 to 3, in which case brackets 3 would be substituted by rods or brackets 30. However, I may employ any other suitable spring construction in connection therewith, as shown in Figs. 6 and 7, where 34 represents a semi-elliptic spring attached to the frame at its center, while the two ends are bearing against the brackets 30 directly or through spring shackles in any desired manner.

With such a construction, it is evident that the vertical wheel displacement will be greater than the spring flexure.

It should be noted that with that type of construction disclosed in Figs. 2, 3, 5, 8 and 9, it is found advantageous to let the spring have considerable initial tension when points 14, 8 and 17 are in a straight line. In other words, before being attached to the bracket through the suspension member, the spring will assume a normal position, as shown dotted in Fig. 2. The point 8, which represents the connection between tension member 5 and bracket 3, may be located at any desired distance above or below the wheel center, and instead of being exactly in a vertical line with the wheel axle 15, as shown, said point may be moved to the right or to the left, as may be found most suitable in practice.

The type of spring shown in Fig. 2 may be an ordinary leaf spring, preferably so arranged that the deflection does not increase proportionately with the tension or pull on the spring but disproportionately. In other words, provision may be made so that the flexure of the spring is small at first for a large amount of tension, but that as the tension increases the amount of flexure increases more rapidly. One of the objects of this construction is to save spring weight, as it would decrease the distance of spring eye movement. One method of accomplishing such a result in practice would be by a construction as shown in Fig. 8. Here, instead of the horizontal tension or suspension member 5 being attached to vertical spring 6, a vertical tension member 36 keeps member 5 in tension by spring 38 through spring shackles 37. In other respects the construction functions the same as that described in Figs. 1 and 2. Fig. 9 shows a modification of this type of construction where the spring 38 is horizontal and bears against an arm 39 of vertical tension member 36 either directly or through spring shackles, as desired, said tension member 36 holding the suspension member in longitudinal tension at all times. It is evident, of course, that instead of a leaf spring I may use a coil spring or any other type of spring structure in connection therewith.

The steering of the wheels is accomplished through wheel steering arms 21 which are given the necessary angle and which form a unit with the conventional steering knuckle, and the well known pitman arm 22, used with the ordinary steering gears. However, I employ a cross shaft 23 with a reversing gear 24, or any other suitable reversing motion, in connection therewith, as it is necessary to move the two steering arms 21 in opposite directions when the vehicle is steered. This is obvious since the customary tie rod between the two wheels is here dispensed with.

By looking at Fig. 3, it is seen that steering rod 25 connects the pitman arm with cross shaft 23, through lever 26, and that the drag link 27 going to one of the front wheels is under tension, while 27', connected to the other front wheel, is under compression.

In Fig. 1—a, steering rod 25 connects pitman arm 22 with the cross shaft 23, in this case located in the front, above pivotal axis 14 of bracket 3. The lower ends of steering levers 28 substantially coincide with said axis 14 and are connected to the wheel steering arm 21 through drag links 27 and 27'. With this construction the usual error in the steering layout is eliminated. The operation of this steering arrangement is in other respects similar to that shown in Fig. 3—a, one drag link 27 being in tension and 27' in compression, depending on whether the wheels are steered to one side or the other. It is understood, of course, that I may steer not only the front wheels with this type of steering layout but any number of wheels in a multiwheeled vehicle.

The brakes on the wheels may be operated in any suitable manner, 35 in Fig. 1 representing the brake drums. One method of applying the brakes would be through rods and cross shaft, similar to those shown in steering layout Fig. 3—a, with the exception that there would be no reversing motion in the cross shafts and the links 27 and 27' would always be in tension (or, if desired, in compression) when the brakes are applied. 22 in such case would, of course, represent the brake arm operated by the foot pedal, or in any other manner. The brakes may be operated by means of any known power as applied to motor vehicles. If the brakes are applied by hydraulic means or compressed air, no brake rods are required and the braking mechanism is greatly simplified.

Having now described my invention what I claim as new and desire to protect by Letters Patent is:

1. In an individual wheel suspension for vehicles, a bracket, means pivotally connecting on end of said bracket at widely separated points to a member extending crosswise of said vehicle, said pivot axis extending substantially at right angles to the line of travel of said vehicle, a wheel journaled at the other end of said bracket, a spring connected to said vehicle at a point spaced from said journal end of said bracket, and a suspension member connecting said spring and said journal end of said bracket to exert a tension on said bracket longitudinally thereof.

2. In an individual wheel suspension for vehicles, a bracket, means pivotally connecting on end of said bracket at widely separated points to a member extending crosswise of said vehicle, said pivot axis extending substantially at right angles to the line of travel of said vehicle, a wheel journaled at the other end of said bracket, a spring connected to said vehicle at a point spaced from said journal end of said bracket, a suspension member connecting said spring and said journal end of said bracket in tensioned relation, means for steering said wheel.

3. In a vehicle, a spring suspension for supporting the load on individually suspended wheels and comprising a wheel supporting bracket having one end pivotally attached at widely separated points to a strong cross member, the axis of the pivotal attachment extending substantially at right angles to the line of travel of the vehicle, a wheel attached to the other end of said bracket, the wheel individually suspended by means of said bracket and by a substantially horizontal suspension member in longitudinal tension, one end of the suspension member connected to the journal end of said bracket, a spring structure connected with the other end of the suspension member.

4. In an individual wheel suspension for vehicles, a bracket, means pivotally connecting one end of said bracket at widely separated points to a member extending crosswise of said vehicle, said pivot axis extending substantially at right angles to the line of travel of said vehicle, a wheel journaled at the other end of said bracket, a spring connected to said vehicle at a point spaced from said journal end of said bracket, a suspension member, means connecting said spring with the said suspension member and means for connecting the suspension member with the journal end of said bracket to hold the bracket and the suspension member at all times in longitudinal tension.

5. In an individual wheel suspension for vehicles, a bracket, means pivotally connecting one end of said bracket at widely separated points to a member extending crosswise of said vehicle, said pivot axis extending substantially at right angles to the line of travel of said vehicle, a wheel journaled at the other end of said bracket, a spring connected to said vehicle at a point spaced from said journal end of said bracket, a suspension member connecting said spring and said journal end of said bracket, the said spring initially strained to hold the suspension member and the bracket at all times in longitudinal tension.

6. In an individual wheel suspension for vehicles, a bracket, means pivotally connecting one end of said bracket at widely separated points to a member extending crosswise of said vehicle, said pivot axis extending substantially at right angles to the line of travel of said vehicle, a wheel journaled at the other end of said bracket, a spring connected to said vehicle at a point spaced from said journal end of said bracket, a suspension member connecting said spring and said journal end of said bracket to exert tension on said bracket longitudinally thereof, means for tensioning the spring.

ETHELBERT FAVARY.